United States Patent
Jaloszynski et al.

(10) Patent No.: US 7,878,183 B2
(45) Date of Patent: Feb. 1, 2011

(54) APPARATUS, SYSTEM, AND METHOD TO PROVIDE AIR TO A DOSER INJECTOR NOZZLE

(75) Inventors: Tory Jaloszynski, Janesville, WI (US); Tim M. Doyle, Greenwood, IN (US); Matthew L. Anderson, Columbus, IN (US)

(73) Assignee: Cummins Filtration IP, Inc., Minneapolis, MN (US)

( * ) Notice: Subject to any disclaimer, the term of this patent is extended or adjusted under 35 U.S.C. 154(b) by 259 days.

(21) Appl. No.: 12/173,221

(22) Filed: Jul. 15, 2008

(65) Prior Publication Data

US 2009/0020623 A1  Jan. 22, 2009

Related U.S. Application Data

(60) Provisional application No. 60/950,310, filed on Jul. 17, 2007.

(51) Int. Cl.
*F02M 23/00* (2006.01)
*F02M 23/04* (2006.01)

(52) U.S. Cl. .................. 123/533; 123/198 A

(58) Field of Classification Search ............... 123/527, 123/531, 533, 198 A; 60/295, 289, 274, 60/286
See application file for complete search history.

(56) References Cited

U.S. PATENT DOCUMENTS

| 4,620,516 A | 11/1986 | Reiim et al. | |
|---|---|---|---|
| 5,522,218 A * | 6/1996 | Lane et al. | 60/274 |
| 5,551,400 A * | 9/1996 | Rice et al. | 123/470 |
| 6,520,769 B2 * | 2/2003 | Tachihara et al. | 431/170 |
| 6,616,063 B2 | 9/2003 | Boecking | |
| 6,742,493 B2 | 6/2004 | Ziegler et al. | |
| 6,959,695 B2 | 11/2005 | Warner et al. | |
| 2003/0070658 A1 | 4/2003 | Warner et al. | |

FOREIGN PATENT DOCUMENTS

| DE | 19856366 C1 | 4/2000 |
|---|---|---|
| DE | 10150518 C1 | 5/2003 |
| DE | 102004003201 A1 | 8/2005 |
| DE | 102004030441 A1 | 1/2006 |
| DE | 102004048336 A1 | 4/2006 |

OTHER PUBLICATIONS

DE 10 2008 033 575.4 Office Action, Mar. 16, 2010.

* cited by examiner

*Primary Examiner*—Mahmoud Gimie
(74) *Attorney, Agent, or Firm*—Kunzler Needham Massey & Thorpe

(57) ABSTRACT

An apparatus, system, and method are disclosed for providing air to an injector nozzle. An injector nozzle is in fluid communication with a dosing fluid input. An opening substantially circumscribes the injector nozzle. The injector nozzle is directed toward the opening, injecting a fluid from the dosing fluid input through the opening. An injector air output is in fluid communication with an air input port and with the opening. The injector air output is directed toward the opening, injecting air from the air input port through the opening. The injector air output creates a positive air pressure around the injector nozzle.

30 Claims, 4 Drawing Sheets

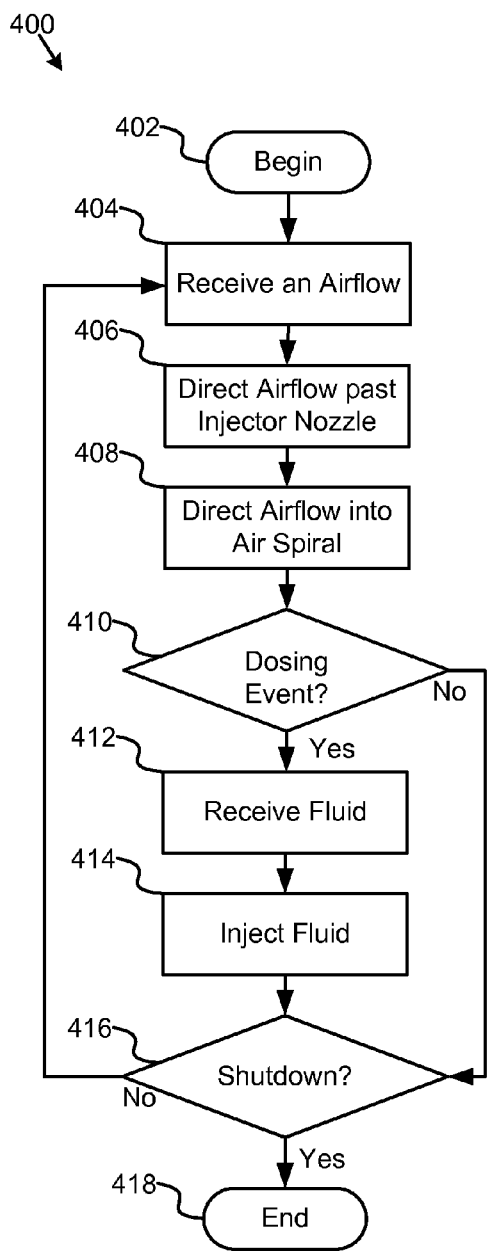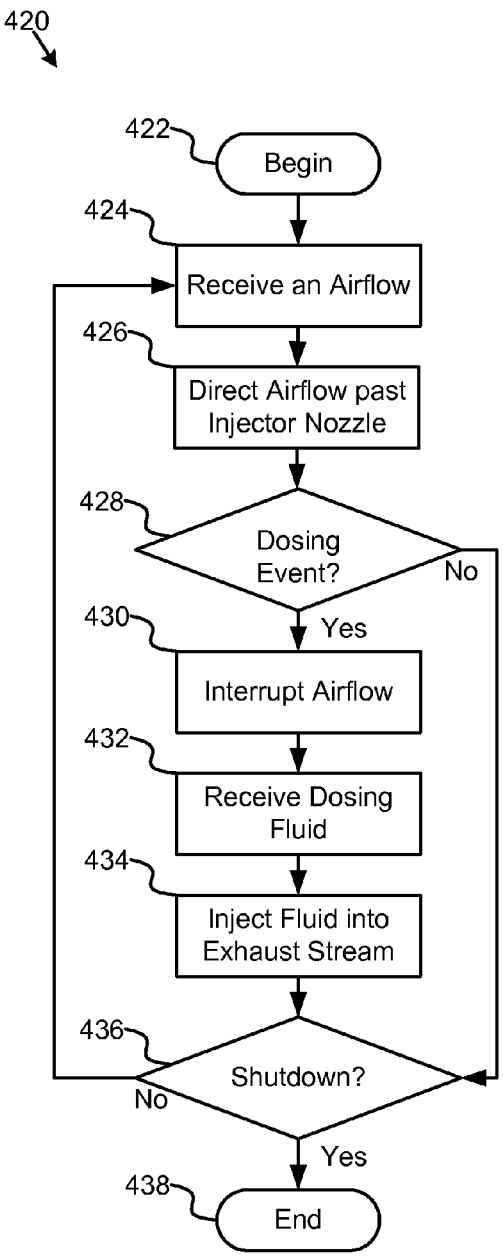
FIG. 4A
FIG. 4B

APPARATUS, SYSTEM, AND METHOD TO PROVIDE AIR TO A DOSER INJECTOR NOZZLE

CROSS-REFERENCES TO RELATED APPLICATIONS

This application is a continuation-in-part of and claims priority to U.S. Provisional Patent Application No. 60/950,310 entitled "APPARATUS, SYSTEM, AND METHOD TO PROVIDE AIR TO DOSER INJECTION NOZZLE" and filed on Jul. 17, 2007 for Tory Jaloszynski et. al, which is incorporated herein by reference.

BACKGROUND OF THE INVENTION

1. Field of the Invention

This invention relates to injector nozzles and more particularly relates to preventing the obstruction of injector nozzles.

2. Description of the Related Art

Injector nozzles are often used in contaminated environments. For example, injector nozzles used in exhaust after treatment systems are often in contact with exhaust, and other contaminants. Dosing systems with injector nozzles are useful in these environments, because they can inject fuels, reducing agents such as urea (also known as carbamide) or ammonia, or other dosing fluids into an exhaust stream for regeneration or oxidation of system components, or reduction of exhaust emissions such as nitrogen oxides. Dosing systems are used with diesel engines, boilers, power plants, and other applications that produce exhaust.

Injecting fuels, catalysts, or reductants into an exhaust stream can burn or oxidize soot and other contaminants that have collected in filters or other exhaust system components, or reduce exhaust emissions. Examples of exhaust system components that may benefit from dosing include catalytic converters, such as diesel oxidation catalysts (DOCs), selective catalytic reduction (SCR) systems, selective non-catalytic reduction (SNCR) systems, and filters such as soot traps and diesel particulate filters (DPFs).

Soot and contaminants from exhaust also attach to the injector nozzles that are used in dosing systems, an effect called carboning. Injector nozzles are especially prone to carboning while they are wet after dosing. Carboning can affect the spray formation and the spray volume of an injector nozzle. The buildup of soot and contaminants on an injector nozzle has many detrimental effects on dosing, including decreased regeneration or reduction performance and decreased fuel economy or emission reduction. In extreme cases, exhaust system components may become completely plugged with soot and other contaminants, causing uncontrolled dosing and damage to the exhaust system components.

SUMMARY OF THE INVENTION

From the foregoing discussion, it should be apparent that a need exists for an apparatus, system, and method that prevent injector nozzle carboning. Beneficially, such an apparatus, system, and method would protect an injector nozzle without interfering with the operation of the injector nozzle.

The present invention has been developed in response to the present state of the art, and in particular, in response to the problems and needs in the art that have not yet been fully solved by currently available dosing systems. Accordingly, the present invention has been developed to provide an apparatus, system, and method for providing air to a doser injector nozzle that overcome many or all of the above-discussed shortcomings in the art.

The apparatus to provide air to a doser injector nozzle is provided with a plurality of elements that functionally execute the necessary steps of receiving an airflow, receiving a liquid, injecting the liquid through an injector nozzle, and directing the airflow past the injector nozzle. These elements in the described embodiments include a dosing fluid input port, an air input port, an injector nozzle, an opening, an injector air output, an air valve, and a doser injector.

In one embodiment, the injector nozzle may be in fluid communication with the dosing fluid input port. In another embodiment, the injector nozzle is directed toward the opening. The opening, in one embodiment, substantially circumscribes the injector nozzle.

In one embodiment, the injector air output is in fluid communication with the air input port and with the opening. In a further embodiment, the injector air output is directed toward the opening. In one embodiment, the injector air output directs an airflow in a direction toward the injector nozzle.

In another embodiment, the injector air output is directed at an angle that is substantially parallel to a surface of the opening and is offset from the injector nozzle. In a further embodiment, the opening is shaped to direct air from the injector air output to form an air spiral.

In one embodiment, the injector air output is in fluid communication with the injector nozzle between the dosing fluid input port and the injector nozzle, and the injector air output is directed through the injector nozzle. In a further embodiment, the injector air output is spatially removed from a surface of the opening and the injector air output is directed toward the opening.

In one embodiment, the air valve is disposed between the air input port and the injector air output. In one embodiment, the dosing fluid input port and the injector nozzle are disposed on the doser injector. In a further embodiment, the injector air output and the air input port are disposed on the doser injector. In another embodiment, the opening comprises a cavity that is disposed on the doser injector.

A system of the present invention is also presented for providing air to an injector nozzle. The system may be embodied by an exhaust conduit, an air source, a fluid source, an injector nozzle, a cavity, and an injector air output. In particular, the system, in one embodiment, includes an engine control module, one or more sensors, and an air valve.

The engine control module, in one embodiment, determines a time that the injector nozzle injects the dosing fluid. In a further embodiment, the engine control module determines a time that the injector air output injects the air from the airflow into the cavity. The engine control module, in another embodiment, may base the determinations on input from the one or more sensors. The one or more sensors may be selected from the group consisting of an air temperature sensor and an air pressure sensor. The engine control module may also control the air valve. In one embodiment, the air source is a turbo charger. In another embodiment, the air source is an air compressor.

A method of the present invention is also presented for providing air to an injector nozzle. The method in the disclosed embodiments substantially includes the steps necessary to carry out the functions presented above with respect to the operation of the described apparatus and system. In one embodiment, the method includes preventing an airflow from entering an exhaust stream during an injecting of dosing fluid into the exhaust stream. The method also may include directing an airflow in a path around an injector nozzle to create an air spiral.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which:

FIG. 4A is a flow chart of one embodiment of a method to provide air to a doser injector nozzle according to the present invention; and FIG. 4B is a flow chart of another embodiment of a method to provide air to a doser injector nozzle according to the present invention.

DETAILED DESCRIPTION OF THE INVENTION

Figure 1:
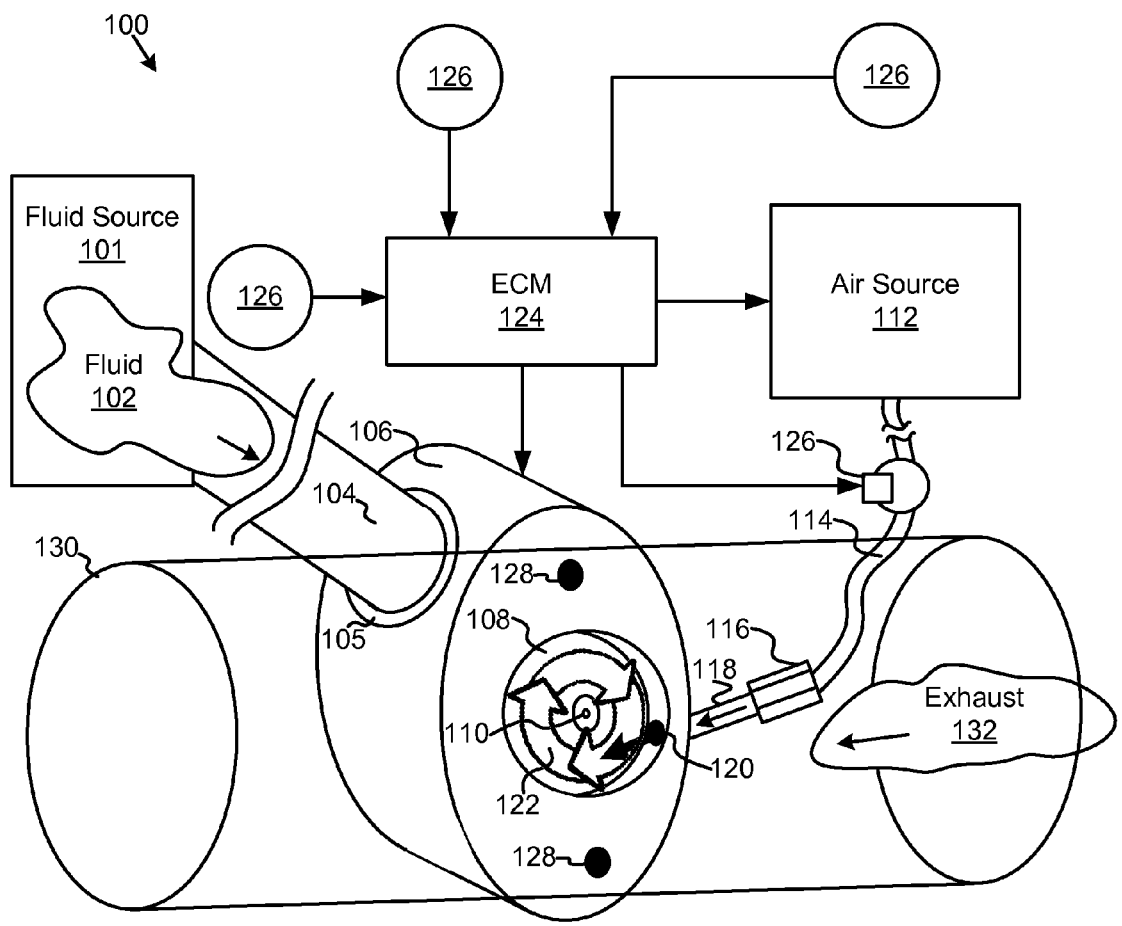
FIG. 1 is a schematic block diagram of a system to provide air to a doser injector nozzle according to the present invention.

One or more of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several computer readable media. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in software, the software portions are stored on one or more computer readable media.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Reference to a computer readable medium may take any form capable of storing machine-readable instructions on a digital processing apparatus. A computer readable medium may be embodied by a transmission line, a compact disk, digital-video disk, a magnetic tape, a Bernoulli drive, a magnetic disk, a punch card, flash memory, integrated circuits, or other digital processing apparatus memory device.

Furthermore, the described features, structures, or characteristics of the invention may be combined in any suitable manner in one or more embodiments. In the following description, numerous specific details are provided to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

The schematic flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

FIG. 1 illustrates one embodiment of a system 100 to provide air to a doser injector nozzle. In one embodiment, the system 100 may comprise a fluid 102, a dosing fluid line 104, a dosing fluid input port 105, a doser injector 106, a cavity 108, an injector nozzle 110, an air source 112, an air conduit 114, an air conduit fastener 116, an air input port 118, an injector air output 120, an air spiral 122, an engine control module (ECM) 124, one or more sensors 126, one or more fasteners 128, an exhaust conduit 130, and an exhaust stream 132.

In one embodiment, the fluid 102 comprises a dosing fluid. The fluid 102 may comprise a gas or a liquid. The fluid 102, in one embodiment, may comprise a saturated hydrocarbon or alkane based fuel such as a petroleum based fuel. The fluid 102 may be derived from naturally occurring petroleum, biological material, or synthetically created. In one embodiment, the fluid 102 is suitable for use in an internal combustion engine that uses compression ignition, such as a diesel fuel. The fluid 102 may also be suitable for use in a filter regeneration event of an exhaust aftertreatment system, such as a hydrocarbon dosing system. The fluid 102, in another embodiment, may comprise a reductant such as urea or ammonia that is suitable for use in an SCR, SNCR, or another dosing system. The exhaust aftertreatment system may be an active or a passive aftertreatment system. In a further embodiment, the fluid 102 has a low pressure.

In the depicted embodiment, the dosing fluid line 104 is configured to deliver the fluid 102 to the doser injector 106. The dosing fluid line 104 may deliver the fluid 102 from a fluid source 101 within the system 100, such as a reservoir, tank, or other fluid source. The dosing fluid line 104, in other embodiments, may comprise one or more shut off valves, filters, or other dosing fluid line components. The fluid source 101 may be disposed in a separate or remote location within the system 100, or may be disposed in a location adjacent to the doser injector 106.

The doser injector 106 may comprise a hydrocarbon doser injector, a urea doser injector, or another type of doser injector. The doser injector 106 may comprise a doser body that comprises the dosing fluid input port 105, the air input port 118, the cavity 108, the injector nozzle 110, the injector air output 120, and/or the one or more fasteners 128. The doser injector 106 may comprise a durable material such as a metal, plastic, ceramic, or the like. The doser injector 106 may be machined, injection molded, blow molded, or otherwise formed.

In the depicted embodiment, the dosing fluid line 104 is coupled to the dosing fluid input port 105 of the doser injector 106. The dosing fluid input port 105 is an interface configured to receive the dosing fluid line 104 such that the fluid 102 from the dosing fluid line 104 is delivered to the doser injector 106. The dosing fluid input port 105 is part of, attached to, and/or disposed on the doser injector 106. The dosing fluid input port 105 may comprise a manifold, passage, channel, or other pathway for the fluid 102 from the dosing fluid line 104 to enter the doser injector 106. In a further embodiment, the dosing fluid input port 105 may comprise one or more fasteners (not shown) that couple the dosing fluid line 104 to the doser injector 106. Examples of fasteners include threaded fasteners such as screw or bolt type fasteners, clamps, glue, welds or other securing devices.

In one embodiment, the doser injector 106 is disposed near an exhaust stream 132 in an exhaust system. In a further embodiment, the doser injector 106 is disposed adjacent to an exhaust conduit 130 such that the doser injector 106 may inject the fluid 102 into the exhaust conduit 130 during a dosing event. The exhaust conduit 130, in one embodiment, may comprise a pipe, tube, channel, manifold, hose, or the like that comprises an interior for the exhaust stream 132 to pass through. The doser injector 106 may be coupled to a side of the exhaust conduit 130 at various angles and orientations, located inside the exhaust conduit 130, integrated with the exhaust conduit 130, or otherwise in fluid communication with the exhaust conduit 130.

In one embodiment, the doser injector 106 comprises a cavity 108. The cavity 108 comprises an opening or space around the injector nozzle 110, providing a path from the injector nozzle 110 that is substantially free of obstructions. In the depicted embodiment, the cavity 108 is disposed on a side of the doser injector 106 that is adjacent to the exhaust stream 132. The cavity 108 is substantially circular, but in other embodiments could be oblong, square, hexagonal, or another shape. The shape of the cavity 108 may be chosen to create a desired airflow pattern within the cavity 108 with respect to the injector nozzle 110, such as the air spiral 122. The cavity 108 may be an opening or a space around the injector cavity 108 that is on the surface of the doser injector 106 or that is recessed in the doser injector 106. The injector nozzle 110 is directed toward the cavity 108, and injects the fluid 102 into the exhaust stream 132 through the cavity 108.

One or more fasteners 128 may couple the doser injector 106 to the exhaust conduit 130 such that a path for the fluid 102 exists from the injector nozzle 110 to the exhaust stream 132 through the cavity 108. The one or more fasteners 128 may comprise one or more gaskets, nuts, bolts, screws, clamps, glue, welds, or other interfacing and/or fastening means.

The injector nozzle 110 injects the fluid 102 into the exhaust stream 132. The injector nozzle 110 may comprise a metal, a plastic, a ceramic, or another durable material. A material for the injector nozzle 110 may be selected based on physical, chemical, or other properties of the fluid 102 and/or of the exhaust stream 132. In one embodiment, the injector nozzle 110 may inject the fluid 102 into the exhaust stream 132 with a uniform spray and a consistent volume during dosing, unless there is carboning or other corrosion on or in the injector nozzle 110.

The injector nozzle 110, in one embodiment, may inject the fluid 102 such that it travels with the exhaust stream 132 into a catalytic converter, such as a diesel oxidation catalyst (DOC), or other catalyst to promote oxidation and to reduce emissions. The fluid 102, in another embodiment, may burn soot and other contaminants from a soot trap or diesel particulate filter (DPF).

The injector nozzle 110 may be in contact with soot and other contaminants from the exhaust stream 132. The soot and other contaminants from the exhaust stream 132 may attach to the injector nozzle 110, affecting the spray formation and the volume of the fluid 102 that the injector nozzle 110 sprays. The attaching of soot and contaminants, or carboning, generally tends to accelerate while the injector nozzle 110 is wet with the fluid 102 after dosing. The buildup of attached soot and contaminants on the injector nozzle 110 and its effects on dosing may also decrease regeneration or reduction performance, decrease fuel economy, and in an extreme case, the DPF may become completely plugged, causing uncontrolled dosing and damage to the DPF or other components.

In the depicted embodiment, the air source 112 is in fluid communication with the doser injector 106. In one embodiment, the air source 112 comprises an air compressor. The air source 112 may also provide air to a braking system, air seats, or other components or systems operatively connected to the exhaust system that require air. In a further embodiment, the air source 112 comprises a turbo charger, as is generally known in the art, which may be used to provide boost pressure to the compression ignition engine. The air conduit 114 connects the air source 112 to the doser injector 106. The air conduit 114 may comprise tubing, hose, pipe, or other conduit material. The air conduit 114 may deliver air to the doser injector 106 from a separate or remote location in the system 100, or from a position in close proximity to the doser injector 106.

The air conduit 114, in one embodiment, may comprise an air valve 126 to control the flow of air from the air source 112 to the doser injector 106. In one embodiment, the air valve 126 is a proportional valve or another type of air valve. The air valve 126 is disposed between the air source 112 and the injector nozzle 110. The air valve 126 may be integrated with the air source 112, with the air conduit 114, with the air conduit fastener 116, with the air input port 118, with the injector nozzle 110, or may be independent from them but disposed in-line with them. In one embodiment, the air valve 126 may be disposed between the air input port 118 and the injector air output 120. In alternative embodiments, other elements may be used to control the flow of air from the air source 112 to the doser injector 106, such as one or more fans, pumps, blowers, compressors, and/or other air control means.

The air conduit fastener 116 is configured to couple the air conduit 114 to the air input port 118. The air conduit fastener 116 may comprise one or more of a threaded fastener such as a screw or bolt type fastener, a clamp, glue, a weld, or another securing device. The air input port 118 is an interface configured to receive the air conduit fastener 116 such that air from the air conduit 114 is delivered to the cavity 108 around the injector nozzle 110 in the injector doser 106. The air input port 118 may be part of, attached to, and/or disposed on or near the doser injector 106. The air input port 118 may comprise a manifold, passage, channel, tube, pipe, input, port or other pathway for the air from the air conduit 114 to enter the cavity 108. The air input port 118 delivers the air to the cavity 108 through the injector air output 120.

The injector air output 120 may comprise a hole or break in a wall of the cavity 108, a nozzle, a tube, a guide, a vent, or another air output that directs or focuses the flow of air from the air conduit 114 past the injector nozzle 110. The injector air output 120 may direct the air such that it passes over, next to, and/or through the injector nozzle 110. In one embodiment, the injector air output 120 delivers the air into the cavity 108 such that there is a positive air pressure in the cavity 108. The positive air pressure is configured to limit the entry of the soot and other contaminants from the exhaust stream 132 into the cavity 108, protecting the injector nozzle 110 from them. The air may also be configured to facilitate evaporation of the fluid 102 from the injector nozzle 110 after dosing. After entering the cavity 108, the positive air pressure may force the air into the exhaust stream 132 or out of the cavity 108 through another path. The positive air pressure may form a curtain of air around the injector nozzle 110, preventing carboning or buildup on the injector nozzle 110.

In other embodiments, the injector air output 120 may deliver the air into the cavity 108 at various angles and positions. These angles and positions are discussed in greater detail with regard to FIGS. 2A, 2B, 2C, and 2D. In the depicted embodiment, the injector air output 120 delivers the air into the cavity 108 at an angle that is substantially parallel to a surface of the cavity 108 and that is at an offset from the injector nozzle 110. The cavity 108 is depicted as substantially circular such that when the injector air output 120 delivers the air at an angle substantially parallel to the surface of the cavity 108 at an offset from the injector nozzle 110 and at an angle tangential to the injector nozzle 110, the air forms an air spiral 122. The air spiral 122 provides a substantially uniform positive air pressure in the cavity 108, with minimal interference to the spray of the fluid 102 from the injector nozzle 110.

The ECM 124, in one embodiment, is in electrical communication with the doser injector 106 and with the air source 112. The ECM 124 is a module that may comprise one or more electrical circuits, electrical devices, controllers, processors, field programmable gate arrays (FPGAs), application specific integrated circuits (ASICs), memories, computer readable media, and/or other electrical devices. The ECM 124 may determine fuel metering, injection timing, dosing timing, and/or other engine operations. In the depicted embodiment, the ECM 124 is in electrical communication with one or more sensors 126 located in the system 100. The air source 112 and the doser injector 106 may comprise one or more of the sensors 126 that are in electrical communication with the ECM 124. In one embodiment, the ECM 124 is configured to receive one or more parameters such as engine crankshaft position and rotations per minute (RPM), engine coolant temperature, intake air temperature, and absolute intake air boost pressure from the one or more sensors 126.

In a further embodiment, the ECM 124 is configured to control the injection of the fluid 102 by the injector nozzle 110 and the delivery of air by the injector air output 120. The ECM 124, in one embodiment, determines a time when the injector nozzle 110 injects the fluid 102 and a time when the injector air output injects or delivers the air. The times may comprise a constant flow, may overlap, may be exclusive, may be periodic, or may be determined based on readings from the one or more sensors 126. The ECM 124 may base the injection of the fluid 102 into the cavity 108 on an amount of fuel burned, a timer, a temperature, or on other parameters. The ECM 124 may control the delivery of air to the cavity 108 such that the flow of air is substantially constant. In a further embodiment, the ECM 124 may control the delivery of air to the cavity 108 such that the flow of air is interrupted during dosing such that the flow of air does not interfere with the flow of fluid 102 from the injector nozzle 110. The ECM 124 may use valves, such as the air valve 126 discussed above, to control the injection of the fluid 102 and the air into the cavity 108.

The ECM 124 may also interrupt the flow of air into the cavity 108 during failure mode effect and analysis (FMEA) type situations such as broken lines, loss of brakes, or other dangerous situations. The ECM 124 may interrupt the flow of air into the cavity 108 when the air source 112 cannot supply enough air, or has diverted air to other applications. The air source 112 may not be able to supply enough air in high altitude situations, in the presence of smoke or other contaminants, at high temperatures, or in other nonstandard situations. The ECM 124 may also be configured to increase the volume of the fluid 102 that the doser injector 106 injects into the exhaust stream 132 when carboning or buildup does occur on the injector nozzle 110.

Figure 2A:
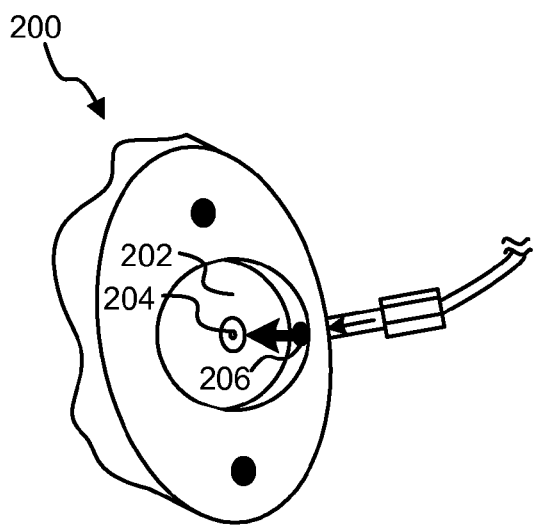
FIG. 2A is a schematic block diagram of one embodiment of an apparatus to provide air to a doser injector nozzle according to the present invention.

FIG. 2A illustrates one embodiment of an apparatus to provide air to a doser injector 200. In one embodiment, the doser injector 200 is substantially similar to the doser injector 106 described above with regard to FIG. 1, and comprises a cavity 202, an injector nozzle 204, and an injector air output 206. The injector air output 206 is configured to deliver, inject, or direct air into the cavity 202 at an angle substantially parallel to a surface of the cavity 202 and at an angle intersecting the injector nozzle 204. The air from the injector air output 206 passes directly over the injector nozzle 204. In one embodiment, the injector air output 206 is configured to interrupt the flow of air into the cavity 202 during dosing such that the flow of air does not interfere with a spray of fluid from the injector nozzle 204, and the fluid can be dispersed in an exhaust stream for dosing.

Figure 2B:
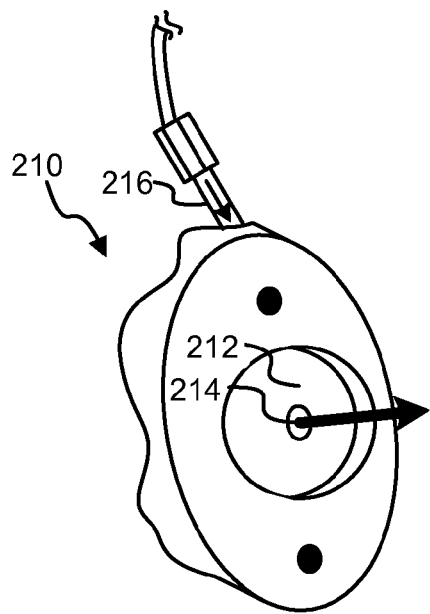
FIG. 2B is a schematic block diagram of another embodiment of an apparatus to provide air to a doser injector nozzle according to the present invention.

FIG. 2B illustrates one embodiment of an apparatus to provide air to a doser injector 210 to control nozzle tip obstruction. In one embodiment, the doser injector 210 is substantially similar to the doser injector 106 described above with regard to FIG. 1, and comprises a cavity 212, an injector nozzle 214, and an injector air output 216. In the depicted embodiment, the injector air output 216 is in fluid communication with the injector nozzle 214 such that air is delivered from the injector air output 216 through the injector nozzle 214 into the cavity 212, instead of through a separate air input. The injector air output 216 may be coupled to a dosing fluid line of the injector nozzle 214 through a valve, joint, "T," input, port, or other coupling means. In one embodiment, the injector air output 216 is in fluid communication with the injector nozzle 214 between a dosing fluid input port of the doser injector 210 and the injector nozzle 214. In addition to providing a positive air pressure in the cavity 212, the air may substantially clear carboning and/or other buildup from the injector nozzle 214. The embodiment shown may also be integrated into existing doser injector manufacturing processes without the addition of a separate air input or air nozzle. In another embodiment, the air travels through a substantially parallel path to the fluid through a separate passage and an opening adjacent to the injector nozzle 214 into the cavity 212.

Figure 2C:
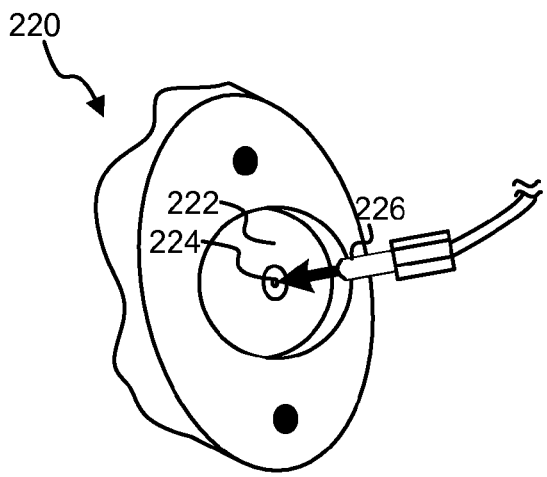
FIG. 2C is a schematic block diagram of a further embodiment of an apparatus to provide air to a doser injector nozzle according to the present invention.

FIG. 2C illustrates one embodiment of an apparatus to provide air to a doser injector 220 to control nozzle tip obstruction. In one embodiment, the doser injector 220 is substantially similar to the doser injector 106 described above with regard to FIG. 1, and comprises a cavity 222, an injector nozzle 224, and an injector air output 226. In the depicted embodiment, the injector air output 226 delivers air into the cavity 222 at an angle perpendicular to a surface of the cavity 222, and the angle substantially intersects the injector nozzle 224. The injector air output 226, as depicted, is spatially removed from the doser injector 220, and may be coupled for support to an exhaust conduit, to the doser injector 220, or to another object disposed near the doser injector 220. In one embodiment, the injector air output 206 is configured to interrupt the flow of air into the cavity 222 during dosing such that the flow of air does not interfere with a spray of dosing fluid from the injector nozzle 224.

Figure 2D:
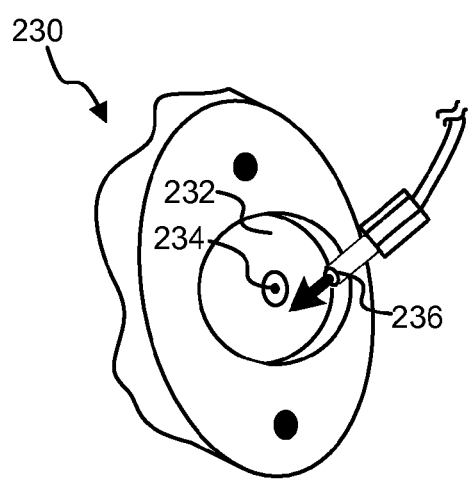
FIG. 2D is a schematic block diagram of another embodiment of an apparatus to provide air to a doser injector nozzle according to the present invention.

FIG. 2D illustrates one embodiment of an apparatus to provide air to a doser injector 230 to control nozzle tip obstruction. In one embodiment, the doser injector 230 is substantially similar to the doser injector 106 described above with regard to FIG. 1, and comprises a cavity 232, an injector nozzle 234, and an injector air output 236. In one embodiment, the injector air output 236 is spatially removed from the doser injector 230, and the injector air output 236 delivers the air into the cavity 232 at an angle that is offset from the injector nozzle 234. The injector air output 226 may be coupled for support to an exhaust conduit, to the doser injector 220, or to another object disposed near the doser injector 220.

Figure 3A:
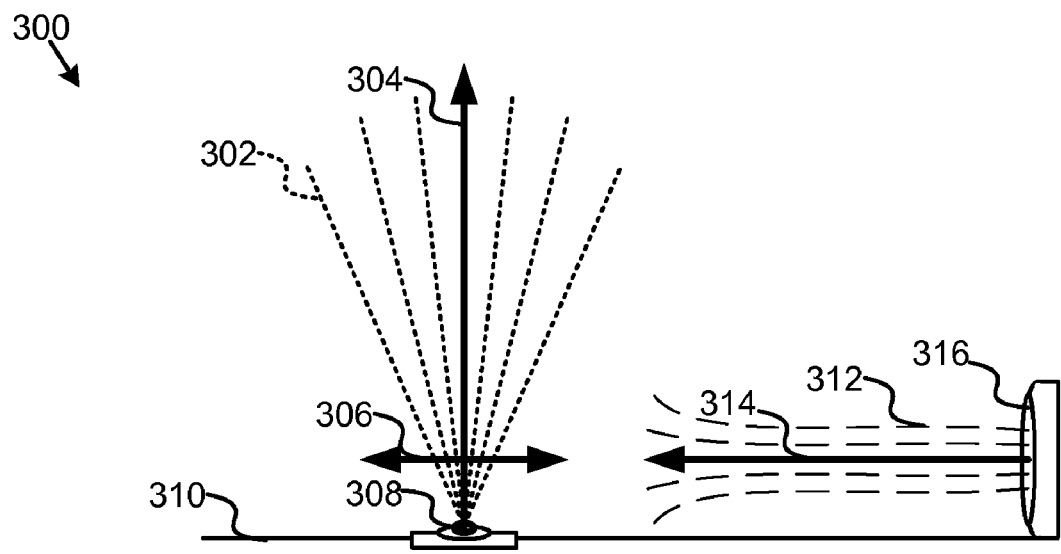
FIG. 3A is a schematic block diagram of one embodiment of a side view of an apparatus to provide air to a doser injector nozzle according to the present invention.

FIG. 3A illustrates one embodiment of a side view of an apparatus to provide air to a doser injector 300. In one embodiment, the doser injector 300 is substantially similar to the doser injector 106 of FIG. 1 described above. The doser injector 300, in the depicted embodiment, comprises a cavity surface 310, an injector nozzle 308, and an injector air output 316.

In one embodiment, the cavity surface 310 is disposed on the doser injector 300. The cavity surface 310 may be recessed or indented into the doser injector 300, or may be flush with or raised from a face, wall, or other surface of the doser injector 300. The cavity surface 310 provides a path substantially free of obstructions for the injector nozzle 308 to inject a fluid 302 from the doser injector 300. In one embodiment, the cavity surface 310 is disposed adjacent an exhaust stream or the like. The cavity surface 310 may further comprise a cavity wall that is shaped to direct an airflow 312 from the injector air output 316 in a predetermined path, such as an air spiral.

In the depicted embodiment, the injector nozzle 308 is disposed on the cavity surface 310 of the doser injector 300. The injector nozzle 308 injects a fluid 302 in an injector nozzle direction 304. The injector nozzle 308 may inject the fluid 302 in a substantially uniform pattern and volume unless the injector nozzle 308 is corroded, contaminated, or the like. The injector nozzle direction 304 may be the direction in which a majority of the fluid 302 is directed, or an average direction of the fluid 304. The injector nozzle direction 304 is the direction that the injector nozzle 308 is directed toward. In the depicted embodiment, the injector nozzle 308 is directed toward and through a cavity or opening adjacent to the cavity surface 310, and the injector nozzle direction 304 is substantially perpendicular to the cavity surface 310. The injector nozzle direction 304 may be oriented in many directions relative to the cavity surface 310, depending on the size, orientation, and direction of an adjacent exhaust stream, the configuration and purpose of the doser injector 300, and other injection considerations.

In the depicted embodiment, the injector air input 316 injects and/or directs the airflow 312 such that it passes the injector nozzle 308. The airflow 312 may pass directly over the injector nozzle 308, may pass on a side of the injector nozzle 308, or may pass through the injector nozzle 308 using the same path as the fluid 304. In the depicted embodiment, the injector air output 316 injects the airflow 312 in an air injection direction 314. The air injection direction 314 may be the direction in which a majority of the airflow 312 is directed, or an average direction of the airflow 312. In one embodiment, the air injection direction 314 comprises a direction or angle at which the injector air output 316 is directed toward. In the depicted embodiment, the injector air output 316 is directed toward and through a cavity or opening adjacent to the cavity surface 310, and is directed within a plane 306 that is substantially parallel to the cavity surface 310, and perpendicular to the injector nozzle direction 304. The air injection direction 314 may be perpendicular to the injector nozzle direction 304 and offset radially from the injector nozzle 308. In other embodiments, the injector air output 316 may be oriented in other angles that are toward and through the cavity or opening adjacent to the cavity surface 310.

Figure 3B:
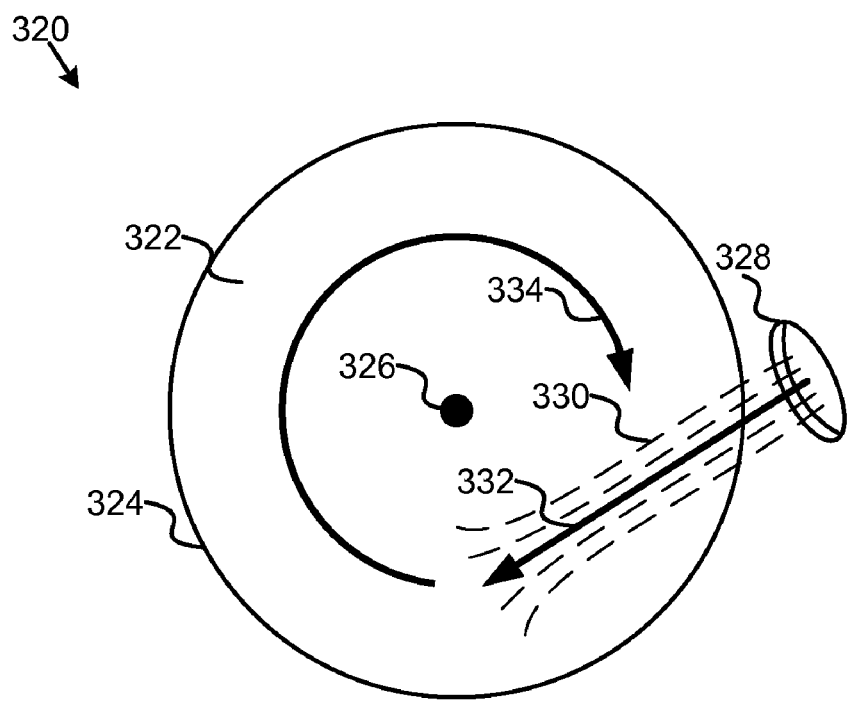
FIG. 3B is a schematic block diagram of one embodiment of a top view of an apparatus to provide air to a doser injector nozzle according to the present invention.

FIG. 3B illustrates one embodiment of a top view of an apparatus to provide air to a doser injector 320. In one embodiment, the doser injector 320 is substantially similar to the doser injector 300 of FIG. 3A and to the doser injector 106 of FIG. 1 described above. In one embodiment, the doser injector 320 comprises a cavity 322, a cavity wall 324, an injector nozzle 326, and an injector air output 328.

In one embodiment, the cavity 322 is disposed on the doser injector 320, and may be recessed in or flush with a surface or face of the doser injector 320. In the depicted embodiment, the cavity 322 is substantially circular, and the cavity wall 324 circumscribes the cavity 322. In the depicted embodiment, the injector nozzle 326 is disposed on the doser injector 320 at or near the center of the cavity 322.

In the depicted embodiment, the injector air output 328 injects or directs an airflow 330 in an air injection direction 332 that is toward and through the cavity 322. The air injection direction 332, in the depicted embodiment, is at a radial offset from the injector nozzle 326, but is within a plane that is substantially parallel to a cavity surface of the cavity 322. In the depicted embodiment, the cavity wall 324 directs the airflow 330 such that the airflow 330 forms an air spiral 334. The air spiral 334, in the depicted embodiment, spirals around the injector nozzle 326, such that the injector nozzle 326 may inject a fluid into the cavity 310 without the air spiral 334 formed by the airflow 330 interfering with the injection. In another embodiment, the injector air output may interrupt the airflow 328 or prevent the airflow 328 from entering the cavity during a fluid injection or dosing event by the injector nozzle 326.

FIG. 4A illustrates one embodiment of a method 400 to provide air to a doser injector. The method 400 begins 402. The begin 402 may be an engine ignition, a first dosing event, a return to safe operating conditions, or another start event. The air input port 118 receives 404 an airflow from the air source 112. In one embodiment, the air input port 118 may receive 404 a substantially constant airflow from the air source 112, and may be configured to interrupt or prevent the airflow from entering the cavity 108. In another embodiment, the air input port 118 may receive 404 an interrupted airflow, pulses of air, or the like from the air source 112. The injector air output 120 directs 406 the airflow past the injector nozzle 110. The injector air output 120 may direct 406 the airflow directly at, across, or over the injector nozzle 110, to a side of the injector nozzle 110, or through the injector nozzle 110. The force of the airflow may remove debris or contaminants from the injector nozzle 110, and/or create a positive air pressure within the cavity 108. The cavity 108, in the depicted embodiment, directs 408 the airflow into an air spiral around the injector nozzle 110.

The ECM 124 determines 410 whether a dosing event should occur. The ECM 124 may determine 410 when a dosing event should occur based on a timer, based on input from the one or more sensors 126, or based on other factors. If the ECM 124 determines 410 that a dosing event should occur, the dosing fluid input port 105 receives 412 a fluid 102, and the injector nozzle 110 injects 414 the fluid 102 through the cavity 108. If the ECM 124 determined 410 that a dosing event should not yet occur, or in response to the injector nozzle 110 injecting 414 the fluid 102, the ECM 124 determines 416 whether to shutdown the system 100. The ECM 124 may determine 416 to shutdown the system 100 because of unsafe operating conditions, an engine shutdown, or another shutdown event. If the ECM 124 determines 416 to shutdown the system, the method 400 ends 418, otherwise the method 400 returns to the receiving an airflow step 404.

FIG. 4B illustrates another embodiment of a method 420 to provide air to a doser injector. The method 420, in one embodiment, is substantially similar to the method 400 of FIG. 4B. The method 420 begins 422. The air input port 118 receives 424 an airflow from the air source 112. The injector air output 120 directs 426 the airflow past the injector nozzle 110. The injector air output 120 may direct 406 the airflow directly at, across, or over the injector nozzle 110, to a side of the injector nozzle 110, or through the injector nozzle 110.

The ECM 124 determines 428 whether a dosing event should occur. If the ECM 124 determines 428 that a dosing event should occur, the air valve 126, which may be integrated with the air source 112, the air input port 118, or the injector air output 120, interrupts 430 the airflow to prevent interference with the dosing event. The dosing fluid input port 105 receives 432 a fluid 102 comprising a dosing fluid, and the injector nozzle 110 injects 434 the fluid 102 through the cavity 108. If the ECM 124 determined 428 that a dosing event should not yet occur, or in response to the injector nozzle 110 injecting 434 the fluid 102, the ECM 124 determines 436 whether to shutdown the system 100. If the ECM 124 determines 436 to shutdown the system, the method 420 ends 438, otherwise the method 420 returns to the receiving an airflow step 424.

As will be appreciated by one skilled in the art in light of this disclosure, a variety of angles and offsets of the injector air outputs 118, 206, 216, 226, 236, 316, and 328 may be utilized without departing from the scope and spirit of the present invention, as described above, as long as the air creates a positive air pressure, or clears the injector nozzle. The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus for providing air to an injector nozzle, the apparatus comprising:
    a dosing fluid input port;
    an air input port;
    an injector nozzle in fluid receiving communication with the dosing fluid input port and fluid injecting communication with a space; and
    an injector air output in air receiving communication with the air input port and air injecting communication with the space, wherein the injected air does not interfere with the injected fluid and reduces the buildup of contaminants on the injector nozzle.

2. The apparatus of claim 1, wherein in a first mode the injector nozzle is in air receiving communication with the injector air output to inject only air into the space via the injector nozzle, and wherein in a second mode the injector nozzle is prevented from receiving air from the injector air output, and the injector nozzle injects only the fluid into the space.

3. The apparatus of claim 2, wherein the apparatus switches between the first and second modes to inject only air and fluid, respectively, into the space via the nozzle.

4. The apparatus of claim 1, wherein the space comprises a cavity open to an exhaust stream conduit.

5. The apparatus of claim 1, further comprising an air valve disposed between the air input port and the injector air output.

6. The apparatus of claim 1, wherein the injector air output injects a stream of air at the injector nozzle, the stream of air contacting the injector nozzle.

7. The apparatus of claim 1, wherein the injector nozzle faces a direction perpendicular to a surface defining the space, and wherein the injector air output faces a direction parallel to the surface defining the space.

8. The apparatus of claim 7, wherein the direction of the injector air output is offset from the injector nozzle, and wherein the space is shaped to direct air from the injector air output into an air spiral about the injector nozzle, the injector nozzle injecting fluid through and out of contact with the air spiral.

9. The apparatus of claim 1, wherein the injection of the fluid into the space via the injector nozzle occurs non-concurrently with the injection of air into the space via the injector air output.

10. The apparatus of claim 1, wherein the injector nozzle faces a first direction and the injector air output faces a second direction substantially opposite the first direction.

11. A system for providing air to an injector nozzle, the system comprising:
an exhaust conduit comprising an interior;
an air source comprising an airflow;
a fluid source comprising a dosing fluid;
an injector nozzle coupled to the exhaust conduit, the injector nozzle in fluid communication with the fluid source and with the interior of the exhaust conduit, the injector nozzle injecting the dosing fluid into the interior of the exhaust conduit;
a cavity substantially circumscribing the injector nozzle; and
an injector air output in fluid communication with the air source and with the cavity, the injector air output injecting air from the airflow into the cavity creating a positive air pressure around the injector nozzle;
wherein the injector nozzle injects the dosing fluid into the interior of the exhaust conduit non-concurrently with the injection of air into the cavity.

12. The system of claim 11, further comprising an engine control module configured to determine a time that the injector nozzle injects the dosing fluid, the engine control module further configured to determine a time that the injector air output injects the air from the airflow into the cavity.

13. The system of claim 12, further comprising one or more sensors in electrical communication with the engine control module, the engine control module determining the time that the injector nozzle injects the dosing fluid, the engine control module further configured to determine the time that the injector air output injects the air from the airflow into the cavity based on input from the one or more sensors.

14. The system of claim 13, wherein at least one of the one or more sensors is selected from the group consisting of an air temperature sensor, and an air pressure sensor.

15. The system of claim 12, further comprising an air valve in electrical communication with the engine control module, the air valve disposed between the air source and the injector air output.

16. The system of claim 11, wherein the injector nozzle injects dosing fluid from the fluid source into an exhaust stream during a dosing event.

17. The system of claim 16, wherein the injector air output prevents a flow of air from entering the cavity during the dosing event.

18. The system of claim 11, wherein the air source comprises a turbo charger.

19. The system of claim 11, wherein the air source comprises an air compressor.

20. An apparatus for airflow control of a doser injector to control nozzle tip obstruction, the apparatus comprising:
a doser injector comprising a dosing fluid input and an air input;
an injector nozzle disposed on the doser injector, the injector nozzle receiving a hydrocarbon fuel from the dosing fluid input and injecting the hydrocarbon fuel into an exhaust stream during a dosing event;
a cavity disposed on the doser injector, the cavity substantially circumscribing the injector nozzle; and
an injector air output disposed within the cavity, the injector air output receiving air from the air input and directing a substantially constant flow of air into the cavity, the injector air output directed at an angle that is substantially parallel to a surface of the cavity, the angle offset from the injector nozzle, the flow of air creating a positive air pressure in the cavity without interfering with the injected hydrocarbon fuel.

21. The apparatus of claim 20, further comprising one or more fasteners disposed on the doser injector, the one or more fasteners configured to attach the doser injector to an exhaust conduit.

22. The apparatus of claim 20, wherein the substantially constant flow of air creates an air spiral within the cavity.

23. A method for providing air to an injector nozzle, the method comprising:
receiving an airflow;
receiving a dosing fluid;
injecting the dosing fluid through an injector nozzle into an exhaust stream during a dosing event; and
directing the airflow past the injector nozzle during a non-dosing event.

24. The method of claim 23, further comprising preventing the airflow from passing the injector nozzle during the dosing event.

25. The method of claim 23, further comprising directing the airflow in a path around the injector nozzle to create an air spiral.

26. The method of claim 23, wherein the airflow passes through the injector nozzle.

27. An apparatus for providing air to an injector nozzle, the apparatus comprising:
means for receiving a dosing fluid;
means for injecting the dosing fluid into an exhaust stream;
means for creating a positive air pressure around the means for injecting the dosing fluid into the exhaust stream, wherein the positive air pressure is created when the means for injecting the dosing fluid is not injecting the dosing fluid into the exhaust stream.

28. The apparatus of claim 27, further comprising means for receiving an airflow and using the airflow to create the positive air pressure.

29. The apparatus of claim 27, further comprising means for creating an air spiral around the means for injecting the dosing fluid into the exhaust stream.

30. The apparatus of claim 27, further comprising means for interrupting the positive air pressure while the means for injecting the dosing fluid injects dosing fluid into the exhaust stream.

* * * * *